US 6,714,931 B1

(12) United States Patent
Papierniak et al.

(10) Patent No.: US 6,714,931 B1
(45) Date of Patent: Mar. 30, 2004

(54) METHOD AND APPARATUS FOR FORMING USER SESSIONS AND PRESENTING INTERNET DATA ACCORDING TO THE USER SESSIONS

(75) Inventors: Karen A. Papierniak, St. Paul, MN (US); James E. Thaisz, Lincroft, NJ (US); Luo-Jen Chiang, Freehold, NJ (US); Anjali M. Diwekar, Matawan, NJ (US)

(73) Assignee: NCR Corporation, Dayton, OH (US)

( * ) Notice: Subject to any disclaimer, the term of this patent is extended or adjusted under 35 U.S.C. 154(b) by 923 days.

(21) Appl. No.: 09/067,806

(22) Filed: Apr. 29, 1998

(51) Int. Cl.⁷ .............................................. G06F 17/30
(52) U.S. Cl. ................... 707/10; 707/6; 707/9; 715/501.1; 715/513; 713/154; 713/155; 713/201; 709/218; 709/230; 705/27; 705/44
(58) Field of Search .................. 707/1–10, 100–104, 707/200–206, 500–501, 513–515; 705/14, 17–18, 26–27, 42–44; 709/203, 217–219, 224–230, 305; 713/200–203, 154–155

(56) References Cited

U.S. PATENT DOCUMENTS

| | | | | |
|---|---|---|---|---|
| 5,812,776 A | * | 9/1998 | Gifford ...................... 709/217 |
| 5,835,712 A | * | 11/1998 | DuFresne ................... 709/203 |
| 5,845,070 A | * | 12/1998 | Ikudome .................... 713/201 |
| 5,884,312 A | * | 3/1999 | Dustan et al. ............... 707/10 |
| 5,907,621 A | * | 5/1999 | Bachman et al. ............. 380/25 |
| 5,960,429 A | * | 9/1999 | Peercy et al. .................. 707/5 |
| 5,987,498 A | * | 11/1999 | Athing et al. ............... 709/203 |
| 6,012,088 A | * | 1/2000 | Li et al. ..................... 709/219 |
| 6,018,619 A | * | 1/2000 | Allard et al. ............... 709/224 |
| 6,035,281 A | * | 3/2000 | Crosskey et al. ............ 705/14 |

OTHER PUBLICATIONS

Zaiane, O.R et al., Discovering web access patterns and trends by applying OLAP and data mining technology on web logs, Research and technology advances in Digital Libraries, 1998, ADL 98 proceedings, IEEE, and 19–29, Apr. 1998.*

* cited by examiner

Primary Examiner—Srirama Channavajjala
(74) Attorney, Agent, or Firm—Ying Tuo; Lowe Hauptman Gilman & Berner, LLP

(57) ABSTRACT

Conventionally, a web site stores Internet data indicating file access status for the files that have been accessed in response to requests from web browsers. Unfortunately, the Internet data are kept as a set of separate and non-correlated data records that are chronologically arranged according to the times at which the requests have been received and processed. Consequently, the Internet data are not arranged meaningful to management and business operation. The present invention is able to correlate web page files (HTML, SHTML, DHTML, or CGI files) with individual users. The present invention is also able to correlate web page files with user sessions during which users perform their business transactions over the Internet.

17 Claims, 10 Drawing Sheets

RECORD $J_1$ : ........ (FOR WEB PAGE FILE)

⋮

RECORD $J_2$ : ........ (FOR GIF FILE)

⋮

RECORD $J_3$ : ........ (FOR JPEG FILE)

⋮

RECORD $J_4$ : ........ (FOR AVI FILE)

(1) Dec 30 00:00:01 AccSer2 dialnet: port S14 call arrived
(2) Dec 30 00:00:18 AccSer2 dialnet: port S14 Steve X succeeded dest 999.888.77.66
(3) Dec 30 00:00:21 AccSer2 dialnet: port S14 connection succeeded dest ppp214.sample.com
(4) Dec 30 00:00:22 AccSer7 acct 71965 dialnet: port S29 session disconnected dest ppp729.sample.com
(5) Dec 30 00:01:23 AccSer3 dialnet: port S13 PPP succeeded dest *Negotiated*
(6) Dec 30 00:01:25 AccSer3 S3 Telnet connection to 906.139.48.252 port 23 terminated(4)
(7) Dec 30 00:01:26 AccSer3 NETServer: port S3 session disconnected user 1
(8) Dec 30 00:02:00 AccSer1 acct 46007 dial: *S18 call arrived*
(9) Dec 30 00:02:39 AccSer1 acct 45979 dial: S17 hung up the phone. Call duration 0:53:35.
(10) Dec 30 00:02:41 AccSer1 acct 45979 dial: S17 hung up the phone. Call duration 0:53:36
(11) Dec 30 00:02:50 AccSer5 acct 45966 dialnet: port S32 session disconnected dest ppp532.sample.com
(12) Dec 30 00:02:57 AccSer6 acct 46007 dialnet: port S18 John Y succeeded dest 906.139.52.47
(13) Dec 30 00:03:01 AccSer3 dialnet: port S13 Terry Z succeeded dest 906.139.59.86
(14) Dec 30 00:03:07 AccSer7 NetS initiated call hang up for S29.
(15) Dec 30 00:04:22 AccSer2 NetS initiated call hang up for S14.
(16) Dec 30 00:04:30 AccSer1 acct 46008 dial: *S20 call arrived*
(17) Dec 30 00:04:33 AccSer7 acct 71965 dial: S29 hung up the phone. Call duration 12:11:31.
(18) Dec 30 00:04:40 AccSer2 acct 72506 dial: S14 hung up the phone. Call duration 0:04:22.
(19) Dec 30 00:04:57 AccSer1 acct 46007 dialnet: port S18 session disconnected dest ppp118.sample.com
(20) Dec 30 00:05:01 AccSer3 dialnet: port S13 session disconnected dest ppp313.sample.com
(21) Dec 30 00:05:38 AccSer8 NetS initiated call hang up for *S17.*

METHOD AND APPARATUS FOR FORMING USER SESSIONS AND PRESENTING INTERNET DATA ACCORDING TO THE USER SESSIONS

BACKGROUND OF THE INVENTION

The present invention relates generally to a method and apparatus for organizing Internet data in a format meaningful to management and business operation.

With the development in information technology and networking infrastructure, more and more business transactions are being conducted electronically over the Internet. Using the Internet to conduct business transactions is now getting so popular that it is currently well know as electronic commerce (or Internet commerce) by industry and the public. It is fair to predict that electronic commerce is having an enormous impact on the way businesses will be conducted and managed in the future. Thus, there is a great interest in studying and understanding consumers' behavior and decision making process in the electronic commerce environment.

Traditionally, business transactions have been conducted at business premises, and there exist methods and techniques to study consumers behavior and decision process for a traditional business environment. For example, a retailer can display its goods in store shelves arranged in accordance with the changes of the four seasons. By observing consumers' reactions to the arrangement, the retailer can adjust the layout of the shelves to facilitate sales of its goods.

In the electronic commerce environment, a retailer or service provider typically displays information about its goods or services on a web site (which includes at least one server) via the Internet. Specifically, the server for the web site can store the information in a set of web page files, such as HTML (Hypertext Markup Language) files. In addition to containing text content, an HTML file may also contain links to other type files, such as graphic or audio files, for displaying pictures and icons and playing audio message. An HTML file may further contain links to other web page files. The other type files can be also stored on the server. By using his/her web browser, a customer (or a potential customer) can remotely navigate through the web site, gaining the information about the goods and services, or ordering selected goods or services. Unfortunately, unlike in traditional business environment, there is no reliable method in the electronic commerce environment at the present time to measure the effectiveness of the layout of a web site. This is due to the difficulties in observing consumers' behavior and analyzing consumers' decision process over the Internet.

Historically, the Internet was designed as an open structure in which the main purpose was to exchange information freely without restriction. To obtain a web page file (such as an HTML file) from a web site, a web browser first sends a request to the server for that web site. Upon receiving the request, the server retrieves the HTML file requested and sends it to the web browser. Upon receiving the HTML file, the web browser displays the HTML file as a web page. If the HTML file also contains links to other type files (such as graphic or audio files), the browser subsequently sends requests to the server for these files. Upon receiving the requests, the server retrieves these files and sends them to the web browser. Upon receiving these files, the browser displays pictures and icons on the web page, or executes an application to play audio files embedded in the web page. If the HTML file also contains a link to another HTML file, upon clicking (or activating) the link, the browser sends a further request to the server for the HTML file. Upon receiving the further request, the server retrieves the HTML files and sends it to the web browser. It should be noticed that browsers interact with web sites in a stateless fashion. On the Internet, a particular web site can be accessed by thousands of browsers in a random fashion. While a browser is sending a sequence of requests to a web site, it does not maintain a constant connection to that web site between any two consecutive requests. To a server, it has no control over the sequences of requests; a subsequent request may not have any logical relationship with the previous one; a sequence of requests may come from different web browsers; a request may be generated from a link embedded in an HTML file. Consequently, it is difficult to consecutively observe customers' activities and behavior in the electronic commerce environment over the Internet.

Current technology provides mechanisms to record access status data (or Internet data) for web page and other type files while a sequence of requests are being received and processed by a server. However, the Internet data are kept as a set of separate and non-correlated data records that are chronologically arranged according to the times at which the requests were received and processed. Consequently, Internet data, without further processing, are not meaningful to management and business operation. In addition, since Internet data are recorded mainly for the purpose of administrating web sites, they may contain redundant and erroneous data that have no use to management and business operation analysis. When Internet data are further processed by other applications (such as by data warehouse applications), these redundant and erroneous data are undesirable because they wastefully occupy storage space and may cause errors in reports or during analysis.

Moreover, Internet data may be generated by different types of servers that may use different formats to record the Internet data. In another words, Internet data generated by different types of servers are not compatible in format. This causes further problem to utilize Internet data.

One difficulty in meaningfully presenting Internet data is how to relate Internet data with individual users. In sending requests to servers, browsers can attach IP (Internet Protocol) addresses together with the requests. Conventionally, IP addresses have been used to identify users. However, one user can use different computers, or two users can use a same computer, to get access to a web site. In either case, an IP address cannot accurately identify a user. Furthermore, in the situation where a user gets access to web sites through an ISP (Internet service provider), IP addresses are dynamically assigned to users when they are connected to the ISP via modem calls. In this situation, different IP addresses may be assigned to a user in different modem call connections.

Another difficulty in meaningfully presenting Internet data is how to organize the data in accordance with transaction events. By way of example, assume that a consumer wants to order a gadget from a web site. In browsing through the web pages in the web site, the consumer may perform the following activities in a purchase event: (1) searching general information about the gadget, (2) searching specific information about a particular type of gadget made by several manufacturers, (3) searching information about prices of the particular type of gadget by the several manufacturers, and (4) ordering a gadget made by a particular manufacture. As described above, the Internet data for recording the activities in the purchase event are kept as a set of separate and non-correlated data records, which may be mingled with other data records.

Therefore, there is a need for a method and apparatus to present Internet data in a format that is meaningful to management and business operation.

There is another need for a method and apparatus to correlate Internet data with users.

There is still another need for a method and apparatus to correlate Internet data with transaction events.

The present invention meets these needs.

SUMMARY OF THE INVENTION

The present invention provides a novel method and associated apparatus for processing Internet data.

Currently, a web site is able to store Internet data indicating access status for the files that have been accessed in response to requests from web browsers. Unfortunately, the Internet data are kept as a set of separate and non-correlated data records that are chronologically arranged according to the times at which the requests have been received and processed. Typically, a web page is associated with a web page file, which can further embed other type files. However, the data records indicating access status for a web page file and other type files embedded in the web page file can be scattered among multiple data records. Consequently, the Internet data is not arranged meaningful to management and business operation.

One difficulty in meaningfully present Internet data is to relate Internet data records with individual users, because IP addresses alone are unable to accurately identify users. Another difficulty in meaningfully present Internet data is to relate Internet data records with user sessions during which users perform their transaction events over the Internet.

The present invention presents the Internet data in a format meaningful to management and business operation. In particular, the present invention can correlate data records with individual users. The present invention can also correlate the data records with user sessions during which users performs their transaction events.

In one aspect, the invention provides a method in using with a first set of logs containing data indicating the files that have been accessed and a second set of logs containing data indicating the users that have accessed the files. The method comprises the steps of:

receiving data from the first and second sets of logs;

identifying a plurality of users;

identifying data for files that have been accessed by the users; and correlating the data for the files with respective users.

In another aspect, the present invention provides a method in using with a first set of logs containing data indicating the files that have been accessed and a second set of logs containing data indicating the users that have accessed the files. The method comprises the steps of:

receiving data from the first and second sets of logs;

identifying a plurality of users;

identifying sessions for the users;

identifying data for files that have been accessed by the users in the sessions; and correlating the data for the files with respective users and respective sessions.

These and other features and advantages of the present invention will become apparent from the following description and accompanying drawings.

BRIEF DESCRIPTION OF THE DRAWINGS

The purpose and advantage of the the present invention will be apparent to those skilled in the art from the following detailed description in conjunction with the appended drawing, in which:

FIG. 6 shows a plurality of exemplary data records in accounting logs;

DETAILED DESCRIPTION OF THE PREFERRED EMBODIMENT

The present invention comprises a novel method and an associated apparatus for organizing Internet data. The following description is presented to enable any person skilled in the art to make and use the invention, and is provided in the context of a particular application and its requirements. Various modifications to the preferred embodiment(s) will be readily apparent to those skilled in the art, and the principles defined herein may be applied to other embodiments and applications without departing from the spirit and scope of the invention. Thus, the present invention is not intended to be limited to the embodiment(s) shown, but is to be accorded with the broadest scope consistent with the principles and features disclosed herein.

Figure 1:
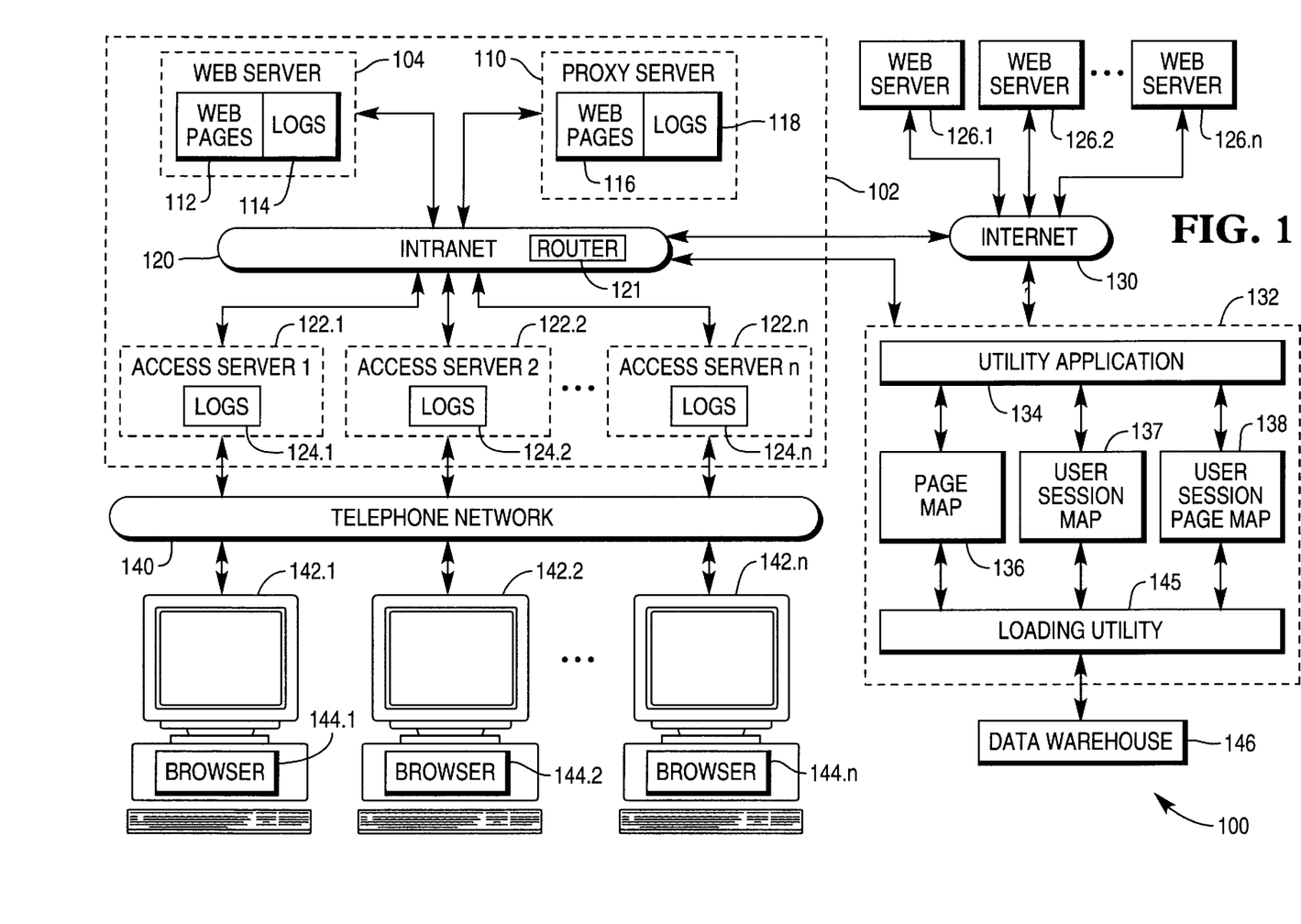
FIG. 1 shows an exemplary network system in accordance with the present invention.

Referring to FIG. 1, there is shown an exemplary network system 100, in accordance with the present invention.

Network system 100 includes an Internet Service Provider (ISP) 102, n web servers ($126._1$, $126._2$, ..., $126._n$) for n respective web sites, a data processing computer 132, a data warehouse 146, Internet 130, telephone network 140, and n user terminals or computers ($142._1$, $142._2$, ..., $142._n$).

Coupled to telephone network 140 are ISP 102 and n user computers ($142._1$, $142._2$, ..., and $142._n$). Coupled to Internet 130 are ISP 102, n web servers ($126._1$, $126._2$, ..., and $126._n$) for n respective web sites, and data processing computer 132.

ISP 102 is able to provide Internet services to user computers ($142._1$, $142._2$, ..., $142._n$) and includes: a web server 104 (internal web server), a proxy server 110, an Intranet (or LAN—Local Area Network) 120, and n access servers ($122._1$, $122._2$, ..., and $122._n$). Coupled to Intranet 120 are web server 104, proxy server 110, and n access servers ($122._1$, $122._2$, ..., and $122._n$). Intranet 120, which includes a router 121, is coupled to Internet 130.

Web server 104 includes a web page repository 112 for storing web page and other type files provided by ISP 102 and server logs 114 for storing data records indicating access status to these files. Web server 104 is able to process requests from browsers, retrieve files from web page repository 112 in response to the requests, sends the retrieved files to the browsers that have generated the requests, and generates and maintains the data records in server logs 114.

Proxy server 110 includes a web page repository 116 for storing web page files and other type files that are retrieved from external web servers ($126._1$, $126._2$, ..., and $126._n$) and proxy logs 118 for storing data records indicating access status to these files. Proxy server 110 is able to process requests for retrieving web page and other type files external to ISP 102. More specifically, proxy server 110 sends requests received to external web servers ($126._1$, $126._2$, ..., and $126._n$) via Intranet (or LAN) 120 and Internet 130, accepts the web page and other type files from the web servers ($126._1$, $126._2$, ..., and $126._n$) via Intranet (or LAN) 120 and Internet 130, stores the files retrieved in web page repository 116, and sends the files to the browsers that have generated the requests via Intranet (or LAN) 120 and telephone network 140. Proxy server 110 is also able to generate and maintain data records in proxy logs 118.

Each of the access servers ($122._1$—access server 1, $122._2$—access server 2, ..., or $122._n$—access server n) is associated with a telephone number. Each of the access servers includes a respective set of accounting logs (or RADIUS—Remote Access Dial In User Services—logs) ($124._1$, $124._2$, ..., or $124._n$), and a plurality of ports to accept dialed-in calls. Each set of the access servers is able to: (1) accept calls from user computers ($142._1$, $142._2$, ..., and $142._n$) via telephone network 140, (2) establish and maintain (modem) connections to called-in user computers, (3) authenticate passwords against user identifications (IDs), (4) manage a set of IP (Internet Protocol) addresses, (5) dynamically assign the IP addresses to called-in user computers, and (6) generate and maintain data records in accounting logs (or RADIUS logs) ($124._1$, $124._2$, ..., and $124._n$) for access activities for the dialed-in user computers.

Each of n web servers ($126._1$, $126._2$, ..., and $126._n$) includes a respective web page repository for storing web page files, a respective set of server logs for storing data records indicating access status of the web page files, and accounting logs for storing data records indicating access activities for users. Each of the n web servers is able to process requests from browsers and retrieves files from its respective web page repository in response to the requests. Each of the n web servers is also able to accept user IDs and passwords from users, check the user IDs against the passwords, generate data records indicating user access status, and maintain the data records in its respective accounting logs.

Each of the n user computers ($142._1$, $142._2$, ..., or $142._4$) runs a respective web browser ($144._1$, $144._2$, ..., or $144._4$), and each of the browsers is able to retrieve files from any one of the servers that are coupled to Intranet 130 or via Internet 140.

Data processing computer 132, includes a utility application 134, a page map 136, a user session map 137, a user session page map 138, and a loading utility 145. Utility application 134 is able to collect data from logs 114, 118 and $124._{1, 2, ..., n}$, and process the data collected. Loading utility 145 is able to load the data from page map 136, user session map 137, and user session page map 138 to data warehouse 146 for further processing.

To communicatively connect a user computer ($142._1$, $142._2$, ..., or $142_n$) to ISP 102, a user dials a telephone number associated with one of the access servers ($122._1$, $122._2$, ..., $122._n$), so that an associated access server can establish a modem connection to the user computer via telephone network 140. After the modem connection has been established, the user sends a user identification (ID) and password to the connected access server. Upon authenticating the password against the user ID, the connected access server assigns an available IP address to the user computer so that the user can use the browser that is being run on the user computer to retrieve web pages via ISP 102.

To retrieve a web page file, the browser sends a Get request to the connected access server. A Get request contains a URL (Uniform Resource Locator) indicating the name of and path to the web page file. Upon receiving the Get request, router 121 determines whether the web page file is located in internal web server 104 or in an external web server ($126._1$, $126._2$, ..., or $126._n$). If the web page file is located internally, router 121 sends the Get request to web server 104 via Intranet 120. Web server 104 retrieves the web page file from web page repository 112 and sends the web page file to the user computer (on which the browser is being run) via telephone network 140. Web server 104 then records access status data for the web page file in server logs 114. If the web page file is located externally, router 121 sends the Get request to proxy server 110 via Intranet 120. Proxy server 110 in turn sends the Get request to an external web server ($126._1$, $126._2$, ..., or $126._n$) via Internet 130. Upon receiving the web page file from the external web server, proxy server 110 stores the web page file in web page repository 116, and sends the retrieved web page file to the user computer (on which the browser is being run). Proxy server 110 then records access status data for the web page file in proxy logs 118.

Upon receiving the web page file, the web browser displays it as a web page. If the web page file also contains links to other type files, the browser further sends Get requests to the connected access server, so that these other type files can be obtained and displayed together with the web page file. The links embedded in the web page file contain the names of and paths to the other type files. If the other type files are located internally to ISP 104, the connected access server sends the Get requests to web server 104; which in turn retrieves the other type files from web page repository 112, sends them to the user computer, and records access status data for the other type files in server logs 114. If the other type files are located externally to ISP 104, router 121 sends the Get requests to proxy server 110; which in turn retrieves the other type files from external web servers ($126._1$, $126._2$, ..., or $126._n$) via Internet 130, sends the other type files to the user computer (on which the browser is being run) via telephone network 140, and records access status data for the other type files in proxy logs 118. If the web page file further contains a link to another web page file, in response to clicking (activating) the link, the browser sends a Get request to the connected access server, so that the web page file can be obtained and a new web page can be displayed.

It should be noted that in FIG. 1 browsers ($144._1$, $144._2$, ..., and $144._n$) interact with web server 104 or proxy server 110 in a stateless fashion. The browsers ($144._1$, $144._2$, ..., and $144._n$) send requests to servers (104 and 110) in a random fashion. To a server (104 or 110), it has no control over the sequences of requests; a subsequent request may not have any logical relationship with the previous one; a sequence of requests may come from different browsers; a request may be generated from a link embedded in an web page file. Consequently, the Internet data are kept as a set of separate and non-correlated data records that are chronologically generated according to the times at which the requests were received and processed. Thus, the Internet data stored in accounting logs ($124._1, 124._2, \ldots, 124._n$), web logs 114, and proxy logs 118, without further processing, are not meaningful to management and business operation.

Figure 2:
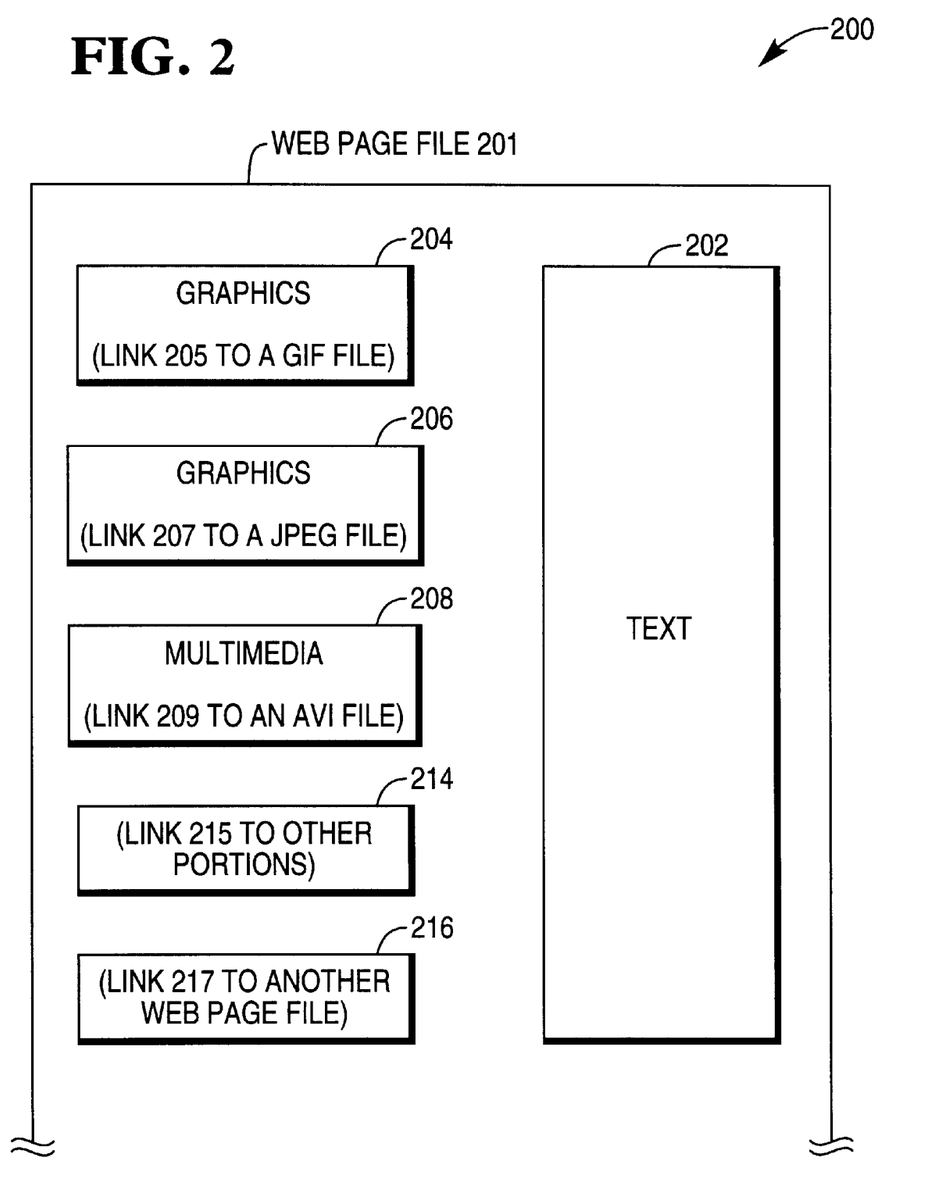
FIG. 2 shows a portion of an exemplary web page, which is associated with a web page file.

Referring to FIG. 2, there is shown a portion of an exemplary web page 200, which is associated with a web page file 201.

A typical web page file can be an HTML, SHTML, DHTML, or CGI file, and may contain links to other type files (such as AVI, GIF, JPEG, and PNG files). Here, HTML stands for Hypertext Markup Language, SHTML for Secure HTML, DHTML for Dynamic HTML, CGI for Common Gateway Interface, GIF for Graphics Interchange Format, JPEG for Joint Photographic Expert Group, AVI for Audio Video Interleave, and PNG for Portable Network Graphic.

As shown in FIG. 2, the portion of web page 200 contains six regions, including: a text region 202; a graphic region 204, which is associated with a link 205 to a GIF file; a graphic region 206, which is associated with a link 207 to a JPEG file; a multimedia region 208, which is associated with a link 209 to an AVI file; a region 214, which is associated with link 215 to other portions of web page 200; and a region 216, which is associated with a link 217 to another web page file. Links 205, 207, 209, 215 and 217 are embedded in web page file 201.

Figure 3:
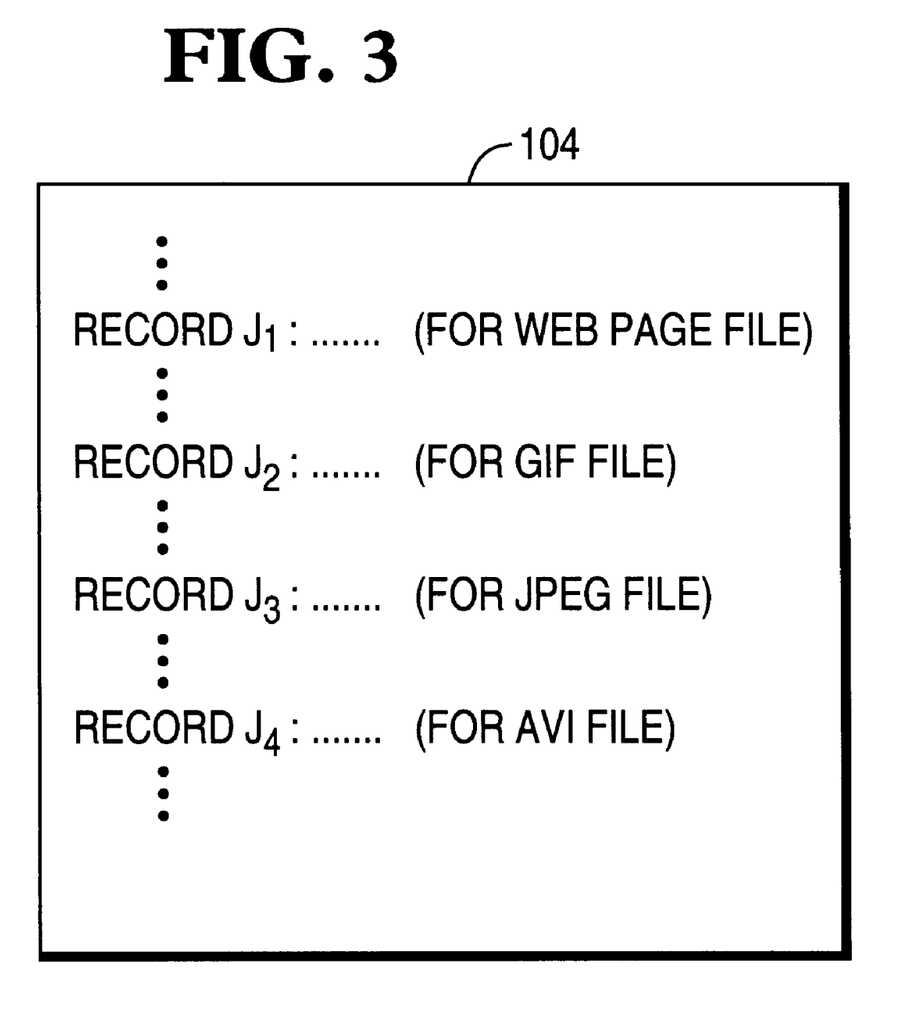
FIG. 3 shows a plurality of exemplary data records in server logs.

Referring to FIG. 3, there is shown a plurality of exemplary data records stored in server logs 114 or proxy logs 118. As shown in FIG. 3, four records $J_{1-4}$ reflect the access status for web page file 201 and the other type files (GIF, JPEG and AVI files) that are linked in web page file 201.

To better describe the process of generating the four records ($J_{1-4}$), it is assumed that: (1) web page file 201 is stored in page repository 112, (2) a modem connection has been established between access server $122._1$ and computer $142._1$ via telephone network 140, (3) web page file 201 has been retrieved by browser $144._1$, (4) web server 104 generates records $J_{1-4}$ in server logs 114, and (5) the n browsers ($144._1, 144._2, \ldots, 144._n$) are all sending Get requests to web server 104.

To retrieve web page file 201, browser $144._1$ sends a Get request to access server $122._1$, which in turn sends the request to web server 104 via Intranet 120. The Get request contains an URL indicating the name of and path to web page file 201. Upon receiving the Get request, web server 104 retrieves web page file 201 from web page repository 112 and sends it, via Internet 105, to access server $122._1$, which in turn sends web page file 201 to browser $144._1$. In the meantime, web server 104 stores information indicating access status for web page file 201 into record $J_1$. Since links 205, 207, and 209 are embedded in web page file 201 to link GIF, JPEG and AVI files respectively, browser $144._1$ further sends three Get requests to access server $122._1$, which in turn sends these requests to web server 104. The three Get requests contain URLs indicating file names of and paths to the GIF, JPEG, and AVI files respectively. Upon receiving the three Get requests, web server 104 retrieves the GIF, JPEG and AVI files from web page repository 112 and sends them, via Intranet 120, to web browser $144._1$. In the meantime, web server 104 stores information indicating access status for the GIF, JPEG, and AVI files into records $J_2, J_3$, and $J_4$, respectively. As shown in FIG. 3, data records $J_{1-4}$ are scattered among the other records in server logs 114; because the n browsers ($144._1, 144._2, \ldots,$ and $144._n$) are all sending Get requests to web server 104, and data records in server logs 114 are chronologically generated according to the times when Get requests have been received and processed by web server 104. It should be noted that, even though FIG. 3 depicts a process of generating access status information for web page file 210 having a particular web page layout, the principle of FIG. 3 applies to any web page files having any web page layouts.

Typically, each of the records in server logs 114 or proxy logs 118 contains the following fields:

IP address assigned to the user, name of the request (such as Get), time stamp on which the request was received, URL (including access path to the file and parameters passed), server name, IP address of the server, bytes received from the browser, bytes sent to the browser, and status code indicating operational status of processing the request.

Figure 4:
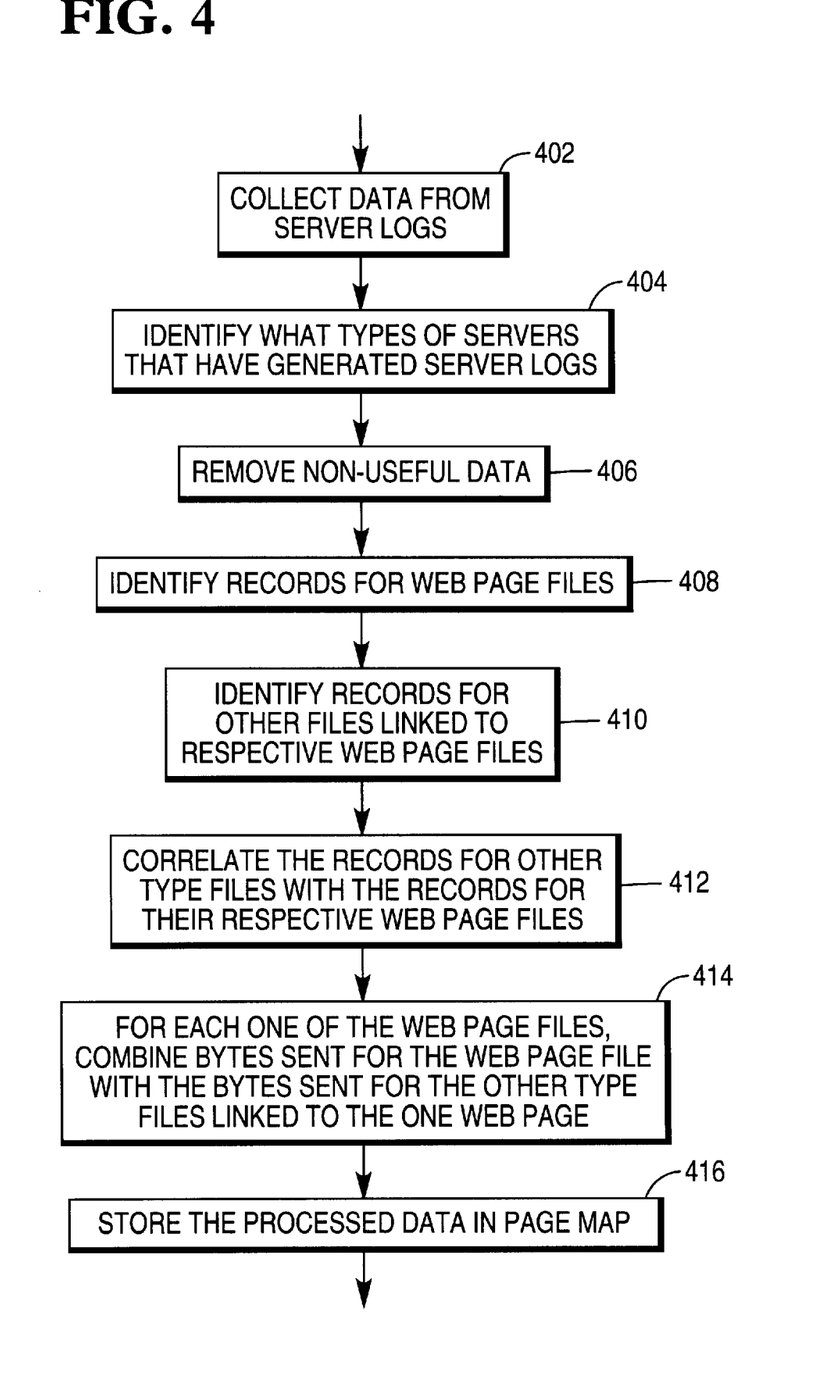
FIG. 4 shows a flowchart illustrating operation of forming a page map in accordance with the present invention.

Referring to FIG. 4, there is shown a flowchart illustrating the operation of forming page map 136 by utility application 112 shown in FIG. 1, in accordance with the present invention.

In step 402, utility application 114 collects data from server logs 112 or proxy logs 118, via Intranet 120.

In step 404, utility application 112 identifies what types of servers that have generated the data, because different types of servers may generate data having different formats. By identifying server types, utility application 112 can process and combine Internet data generated by different types of servers. In the present invention, the server type can be identified by the fields included and orders of the fields in the logs.

In step 406, utility application 112 removes non-useful data from the data collected in step 402. By way of one example, a backspace in a URL is non-useful character; one of the two "//" in a URL is a non-useful character because two "//" have the same meaning as one "/" to a server. Thus, the backspace and one "/" can be removed. By way of another example, the data in a record for retrieving a file associated to a unrecognizable URL is not useful, because no file can be found in response to the URL. Thus, the whole record can be removed. Typically, status code field in a data record indicates whether a request has been successfully processed or not. This step is advantageous because server access logs may contain a huge volume of data. Keeping non-useful data in applications, such data warehouse applications, not only is wasteful of storage space, it may also cause errors in the reports and during analysis.

In step 408, utility application 112 identifies records that store data indicating file access status for web page files (HTML, STHML, DHTML, or CGI files). In the example shown in FIG. 3, record $J._1$ for web page file 201 shown in FIG. 2 will be identified in step 408.

In step 410, utility application 112 identifies records that store data indicating file access status for other type files (such as GIF, JPEG and AVI files) that are linked into respective web page files. In the example shown FIG. 3, records $J_{2-3}$ will be identified to be linked to web page file 201 shown in FIG. 2.

In step 412, utility application 112 correlates the records for the identified other type files with their respective identified web page files by using the IP address and time stamp fields in the these records. As described above, if any other type files are linked into a web page file after a browser has received a web page file, the browser immediately sends requests out to retrieve the other type files. Hence, the IP address in the request for retrieving the web page file is the same IP address in the requests for retrieving the other type files. In addition, the time at which the request for retrieving the web page file was received should be close to those at which the requests for retrieving the other type files were received. Therefore, utility application 112 correlates the following records together:

(1) a particular record for a particular web page file, which contains an IP address and time stamp, and (2) a set of records for the other type files, which contain the same IP address with that in the particular record; and contain the times close to (within two seconds, for example) that in the particular record.

In the example shown in FIG. 3, records $J_{2-4}$ can be correlated with record $J_1$.

In step 414, for each of the web page files, utility application 112 calculates a length by combining the bytes sent for the one web page file with the bytes sent for the other type files linked in the one web page file. In the example shown in FIG. 2, the bytes sent for web page file 201 will be combined with the bytes sent for GIF, JPEG and AVI files. The length is useful for an Internet Service Provider to manage its operation, because it can provide the information to determine the bandwidth used and the cost to send these files.

In step 416, utility application 112 stores the data processed in the steps (406, 408, 410, 412, and 414) in page map 136 shown in FIG. 1.

Figure 5:
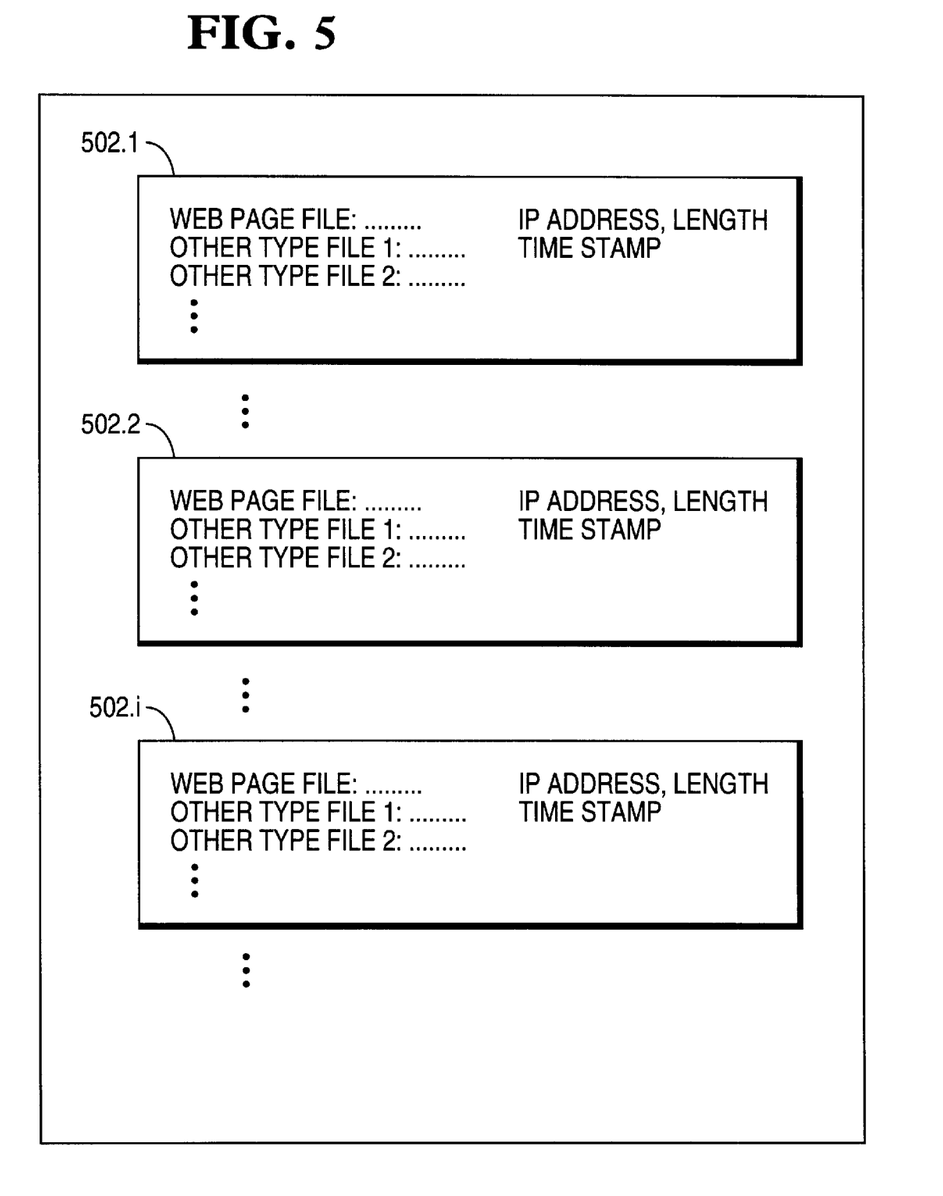
FIG. 5 shows a plurality of exemplary data records in the page map.

Referring to FIG. 5, there is shown a plurality of exemplary records in page map 136, in accordance with the present invention.

As shown in FIG. 5, page map 136 contains a plurality of data records $502._1$, $502._2$, ..., $502._i$, ... Each of the records may include several physical or logical storage units. Each of the records stores the correlated information indicating the access status for a web page file and other type files linked to the web page file. Each of the records also stores an IP address used to retrieve a web page file, a time stamp indicating the time at which a request was received, and a combined length for all the bytes sent for the web page file and the other type files.

Referring to FIG. 6, there is shown a plurality of exemplary data records stored in accounting logs ($124._1$, $124._2$, ..., and $124._n$).

A data record in the accounting logs typically contain some of the following fields:

time stamp (indicated by year, month, day and time), access server name, account number, type of connection or protocol used, dialed-in port ID, user ID, IP address assigned the user, status of connection, and call duration.

As shown in FIG. 6, each of the data records indicates connection status (such as call arrived, connection succeeded, connection failed, session disconnected, etc.) for a user. By correlating a set of associated data records, an access session can be defined for a user. For example, data records (1), (2), (15) and (18) indicate an access session for a user identified by user ID SteveX. Specifically, data record (1) indicates that a call arrived at time 00:00:01 from port S14 via access server 2 from a user. Data record (2) indicates the user provided user ID SteveX via port S14, and access server 2 assigned IP address 999.888.77.66 to user ID SteveX at 00:00:18 (start time), after access server 2 authenticated password provided by the user against user ID SteveX. Data record (15) indicates the user initiated call hang up for port S14 at 00:04:22 (end time). Data record (18) indicates that access server 2 disconnected the user from port S14 at 00:04:40. It should be noted that record (1) indicates port S14 was assigned to an access event for the user identified by user ID SteveX, and record (18) indicates port S14 was released from the access event.

Figure 7:
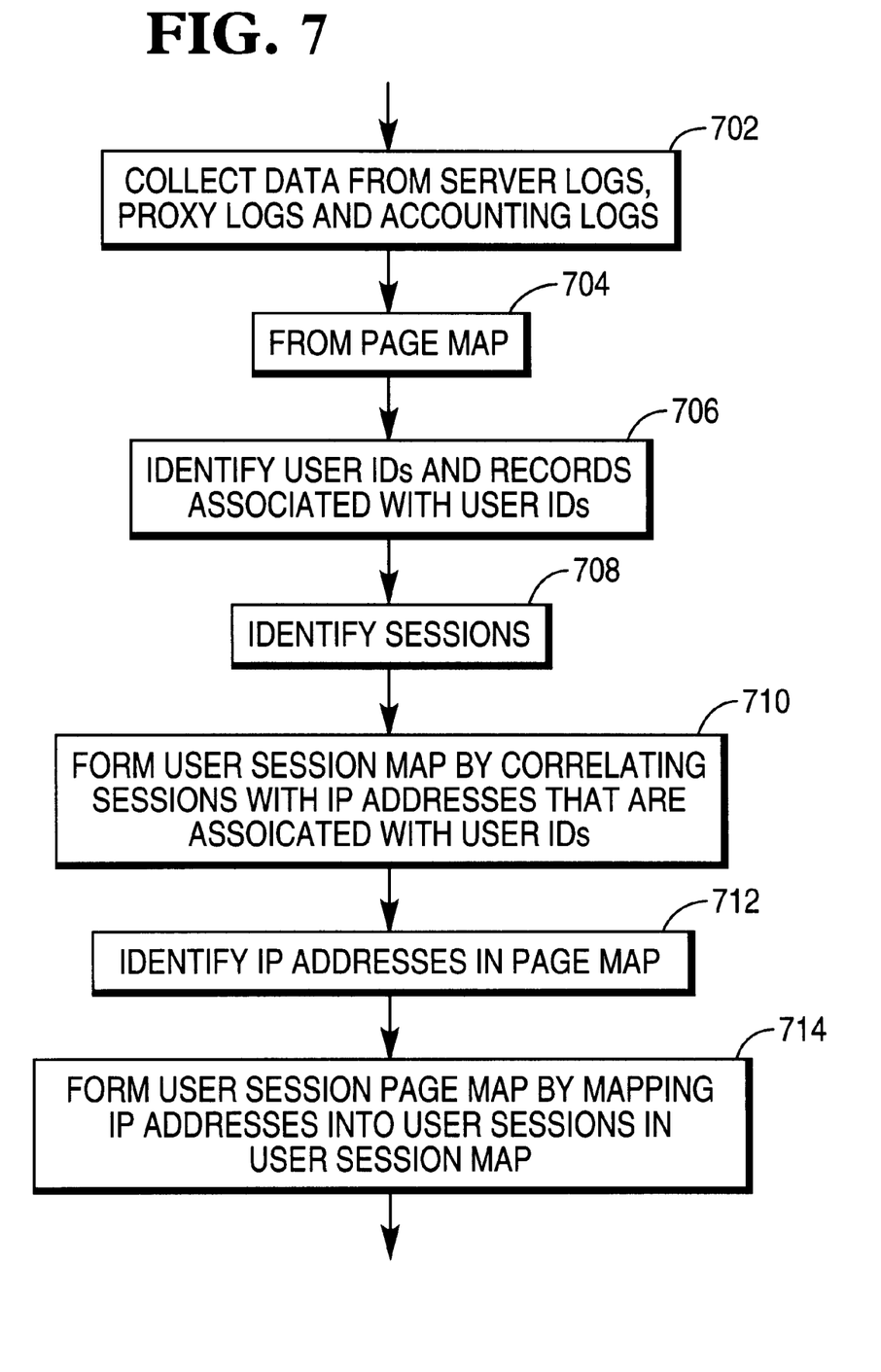
FIG. 7 shows a flowchart illustrating operation of forming a user session map based on user sessions, in accordance with the present invention.

Referring to FIG. 7, there is shown a flowchart illustrating the operation of forming user session map 137 based on user sessions, in accordance with the present invention.

As shown in FIG. 7, at step 702, utility application 134 collects data records from server logs 114, proxy logs 118, and the accounting logs ($124._1$, $124._2$, ..., $124._n$).

At step 704, application utility 134 forms page map 136 by using the data records collected from server logs 114 or proxy logs 118 (specific steps are shown in FIG. 4).

At step 706, using the data records collected from the accounting logs, utility application 134 identifies user IDs and the data records associated with the user IDs. Using data records (1), (2), (15) and (18) shown in FIG. 6 as an example, these four data records are associated together by: (1) a common port S14, (2) time stamp, and (3) user ID SteveX.

At step 708, utility application 134 identifies sessions by correlating the associated data records in the accounting logs. A session can be identified by: an IP address assigned to a user ID, start time and end time of the access activities for the user ID, and a port number. Using data records (1), (2), (15) and (18) shown in FIG. 6 as an example, the session for user ID SteveX is identified by IP address 999.888.77.66 contained in data record (2), call in time contained in data record (1), disconnecting time contained in data record (18), and port S14 contained in data records (1), (2), (15) and (18).

At step 710, utility application 134 forms user session map 137 (shown in FIG. 8) by correlating sessions with user IDs and IP addresses. Using data records (1), (2), (15) and (18) shown in FIG. 6 as an example, session record $806._1$ in record unit $804._1$ (see FIG. 8) contains session information for these four data records.

At step 712, utility application 134 identifies IP addresses and time stamp contained in web page files stored in page map 136 (see FIG. 5).

At step 714, utility application 134 forms user session page map 138 by correlating web page files in page map 136 with user sessions in user session map 137, based on: (1) IP addresses, (2) start and end times in user sessions, and (3) access times of the web page files. The correlating process can be specifically illustrated using session record $906._1$; in which: (1) IP address is 999.888.77.66, (2) session start time is December 30, 00:00:18, and session end time is December 30, 00:04:22, and (3) web page files $916._1$, $916._2$, ... were accessed between the session start time and session end time. Thus, in page map 136, all web pages files having IP address 999.888.77.66 and access time between 00:00:18 and 00:04:22 of December 30 will be mapped into user session record $906._1$.

Figure 8:
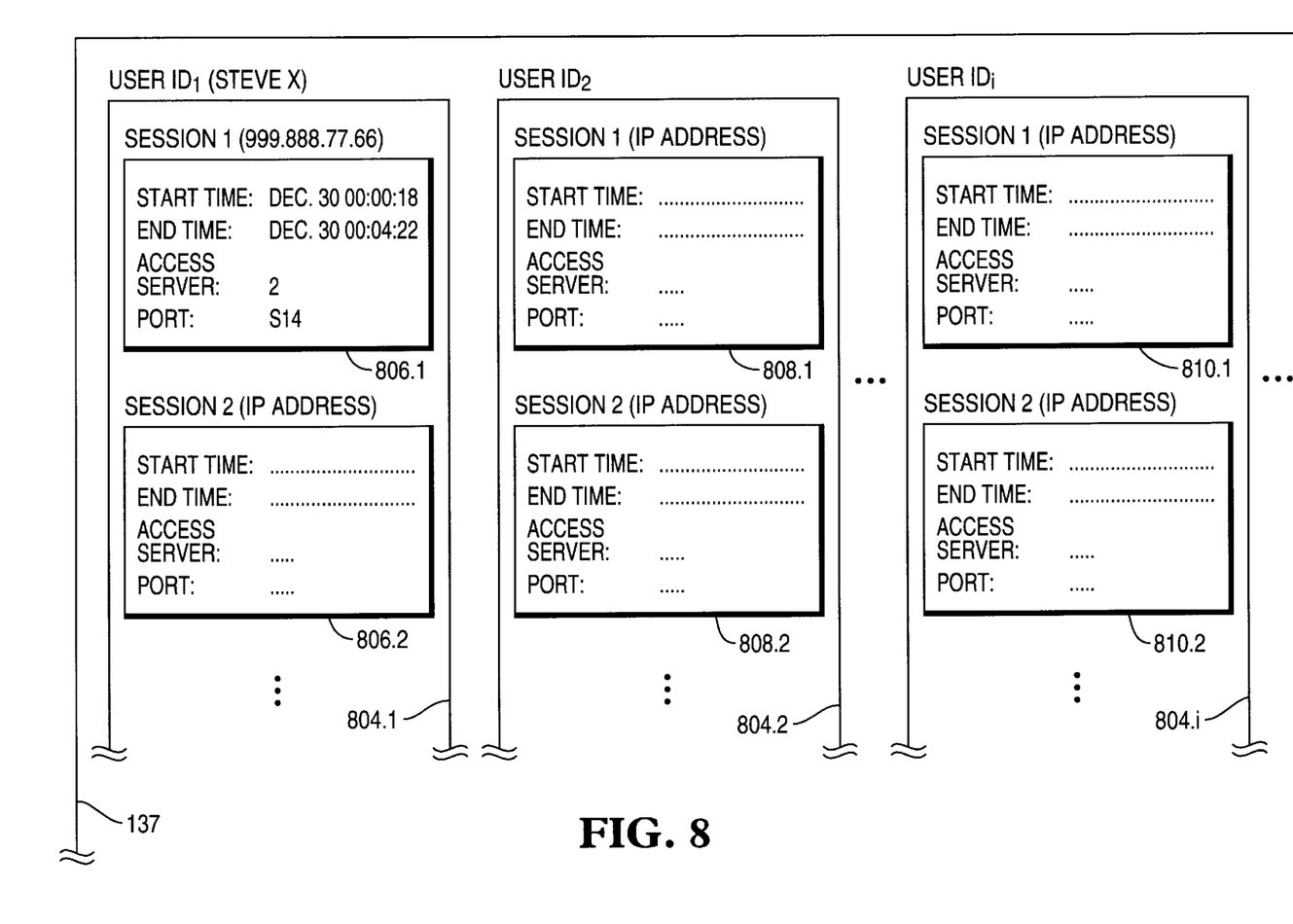
FIG. 8 shows a plurality of exemplary data records in the user session map in accordance with the present invention.

It should be noted that the principle illustrated in FIG. 8 can also be used to processed the data records stored in the web logs and accounting logs in web servers ($126._1$, $126._2$, ..., $126._n$).

Referring to FIG. 8, there is shown a plurality of exemplary records in user session map 137, in accordance with the present invention.

As shown in FIG. 8, user session map 137 includes a plurality of record units ($804._1$, $804._2$, ..., $804._i$, ...) for user $ID._1$, user $ID._2$, ..., user $ID._i$, ... respectively. Each of the record units contains a plurality of user session records for a respective user ID. Each of the user session records contains session information regarding: session start time, session end time, access server number, and call in port. For example, record unit $804._1$ contains a plurality of user session records ($806._1$, $806._2$, . . . ) for user ID SteveX. User session record $806._1$ contains the information for the session identified by IP address 999.888.77.66 for data records (1), (2), (15) and (18) shown in FIG. 6.

Since each of the access servers shown FIG. 1 is associated with a unique telephone number and a port in an access server is associated with a trunk number (the three digits after area code), the server number in a data record can indicate the origination of a dialed-in call. Thus, the data records in FIG. 8 are able to provide the information in three important aspects:

(1) users (identified by user IDs), (2) start and end times (during which activities occurred), and (3) origination of the users (identified by server and port numbers).

Figure 9:
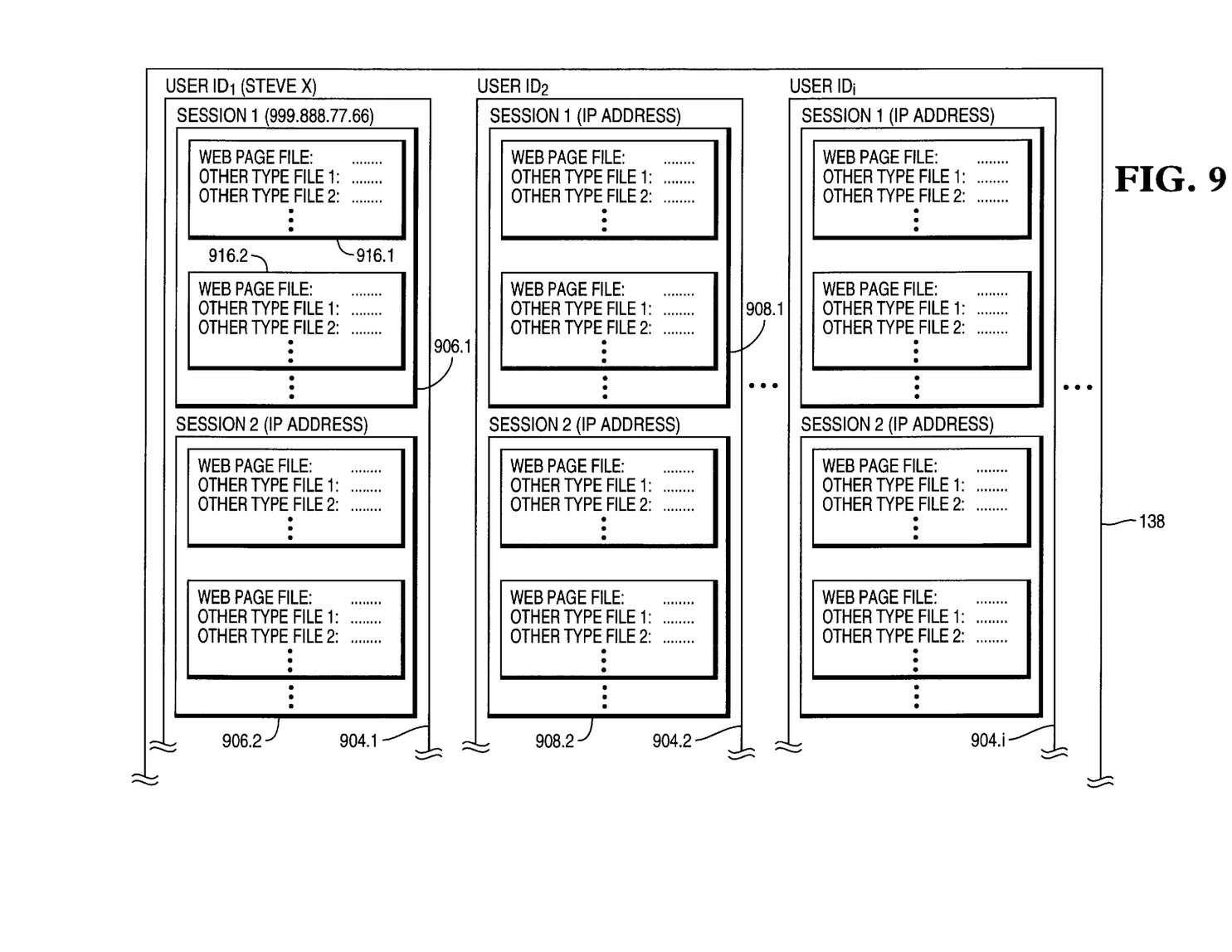
FIG. 9 shows a plurality of exemplary data records in the user session page map in accordance with the present invention.

Referring to FIG. 9, there is shown a plurality of exemplary record units in user session page map 138, in accordance with the present invention.

As shown in FIG. 9, user session page map 138 includes a plurality of record units ($904._1$, $904._2$, . . . , $904._i$, . . . ) for user $ID._1$, user $ID._2$, . . . , user $ID._i$, . . . respectively. Each of the record units contains a plurality of user session records for a respective user ID. Each of the user session records contains, identified by an IP address, a plurality of web page files and their respective other type files. For example, record unit $904._1$ contains a plurality of user session records ($906._1$, $906._2$, . . . ) for user ID SteveX. User session record $906._1$, identified by IP address 999.888.77.66, contains a plurality of web page files ($916._1$, $916._2$, . . . ).

It should be readily noted that Internet data shown in FIG. 9 are presented in a format meaningful to business management and operation. Specifically, all other type files are correlated with their respective web page files, all web page files are correlated with their respective user sessions, and all user sessions are correlated with their respective user IDs.

Figure 10:
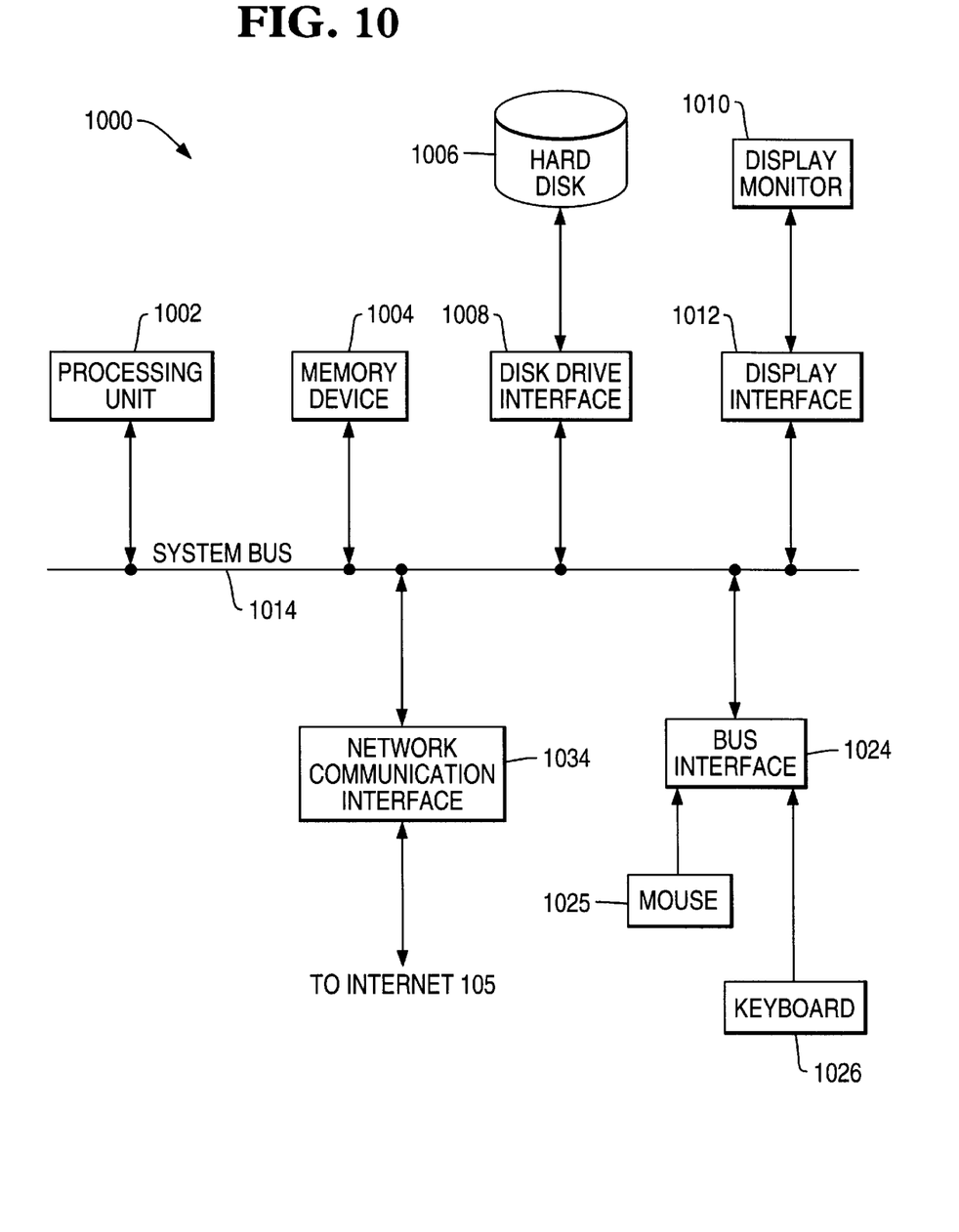
FIG. 10 shows an exemplary data processing computer to run utility application, in accordance with the present invention.

Referring to FIG. 10, there is shown an exemplary data processing computer 132 to run utility application 112, in accordance with the preset invention.

As shown in FIG. 10, the data processing computer comprises a processing unit 1002, a memory device 1004, a hard disk 1006, a disk drive interface 1008, a display monitor 1010, and display interface 1012, a bus interface 1024, a mouse 1025, a keyboard 1026, a network communication interface 1034, and a system bus 1014.

Hard disk 1006 is coupled to disk drive interface 1008, display monitor 1010 is coupled to display interface 1012, and mouse 1025 and keyboard 1026 are coupled to bus interface 1024. Coupled to system bus 1014 are: processing unit 1002, memory device 1004, disk drive interface 1008, display interface 1012, bus interface 1024, and network communication interface 1034.

Memory device 1004 is able to store programs (including instructions and data). Operating together with disk drive interface 1008, hard disk 1006 is also able to store programs. However, memory device 1004 has faster access speed than hard disk 1006, while hard disk 1006 has higher capacity than memory device 1004.

Operating together with display interface 1012, display monitor 1010 is able to provide visual interface between programs being executed and a user.

Operating together with bus interface 1024, mouse 1025 and keyboard 1026 are able to provide inputs to computer system 1000.

Network communication interface 1034 is able to provide an interface between computer system 1000 and Intranet 107.

Processing unit 1002, which may include one or more processors, has access to memory device 1004 and hard disk 1006, and is able to control operations of the computer by executing programs stored in memory device 1004 or hard disk 1006. Processing unit 1002 is also able to control the transmissions of programs and data between memory device 1004 and hard disk 1006.

In the present invention, utility application 112 can be stored in either memory device 1004 or hard disk 1006, and be executed by processing unit 1002.

While the invention has been illustrated and described in detail in the drawing and foregoing description, it should be understood that the invention may be implemented through alternative embodiments within the spirit of the present invention. Thus, the scope of the invention is not intended to be limited to the illustration and description in this specification, but is to be defined by the appended claims.

What is claimed is:

1. A method of arranging Internet data stored as separate non-correlated data record that relate to Internet data records with individual users, comprising:

forming a page map;

forming a user session map; and forming a user session page map.

2. The method of claim 1, wherein: (a) a user provides a user identification (ID) before getting access to files, and (b) an address is dynamically assigned to the user, and wherein forming a user session page map correlates the data with the user by using the user ID and the address assigned to the user.

3. The method of claim 2, wherein the address is an Internet Protocol (IP) address.

4. The method of claim 1, comprising displaying the user session page map.

5. The method of claim 1, comprising collecting data from server logs and proxy logs.

6. The method of claim 5, comprising correlating records from the server logs and the proxy logs.

7. The method of claim 6, comprising identifying a particular record for a particular web page file having an IP address and a time stamp and correlating other records having the same IP address and a time stamp within a predetermined time difference relative to the particular record and grouping these records together.

8. The method of claim 7, the web page files include HTML, SHTML, DHTML, CGI, GIF, JPEG, and AVI files.

9. The method of claim 7, wherein the IP address is the web server IP address.

10. The method of claim 7, wherein the IP address is a user IP address.

11. The method of claim 6, comprising records including the same IP address are grouped together.

12. The method of claim 1, comprising defining an access session by a user.

13. The method of claim 12, comprising collecting data from server logs, proxy logs and accounting logs.

14. The method claim 13, wherein the accounting log is a RADIUS log.

15. The method of claim 12, wherein the access session is identified by an IP address assigned to a user ID, start time and end time of the access activities for the user ID, and a port number.

16. The method of claim 1, wherein the user session map is formed by correlating web page files in the page map with user sessions in the user session map.

17. The method of claim 16, wherein the user session map is based on IP addresses, start and end times in user sessions and access times of the web page files.

* * * * *